Jan. 6, 1953 W. M. THOMSON 2,624,201
MILK SAMPLING DEVICE
Filed Sept. 21, 1949

INVENTOR.
WILLIAM M. THOMSON.
BY
Pennie, Edmonds, Morton & Barrows
ATTORNEYS.

Patented Jan. 6, 1953

2,624,201

UNITED STATES PATENT OFFICE 2,624,201

MILK SAMPLING DEVICE

William M. Thomson, New Scotland Township, Albany County, N. Y.

Application September 21, 1949, Serial No. 116,880

1 Claim. (Cl. 73—425.4)

This invention relates to liquid sampling and more particularly concerns an improved device by means of which samples of milk, or other liquid may be taken from different cans or other bulk containers in individual containers such as test tubes, whereby contamination of the milk or liquid in a sample taken from one can by liquid carried from another can as a residue in a sampling dipper or container may be avoided.

Many tests made of milk and other liquid require withdrawal on small samples from large liquid containers. Thus, fresh milk is subjected to a variety of tests and for this purpose small samples are taken from each of a number of large milk cans in which the milk is sent to the processing plant by the farmer. The milk from the several cans must be separately tested to effectively determine the dairy herds or farms having diseased cattle or unsatisfactory milk collecting methods or equipment.

In the past, milk samples for test purposes have been taken from successive cans by sampling devices similar to a long-handled dipper having a cylindrical container that holds the amount of milk required for the test. The sample taken by the dipper from each can was customarily emptied into a test tube or other container and the dipper was then employed to take a sample from the next can. This procedure may result in contamination of the sample taken from one can by milk remaining in the dipper and carried over from a previously sampled can.

According to the present invention, a simple and inexpensive device is provided in the form of an elongated rod or handle and holder for an individual liquid sample container, such as a test tube, the device incorporating elements that releasably hold the test tube to the device adjacent one end thereof so that the test tube can be dipped into the liquid in a can or bulk container to take a sample therefrom. The filled test tube can be readily removed from the handle and holder device and replaced by an empty test tube for taking a sample from another can. The handle and holder device is formed to present smooth unbroken surfaces, whereby the clinging or accumulation of milk thereon is minimized, and whereby the device can be readily cleansed of milk by a simple rinsing operation.

In describing the invention in detail, reference will be made to the accompanying drawing, in which a preferred embodiment thereof is illustrated.

Figure 4:
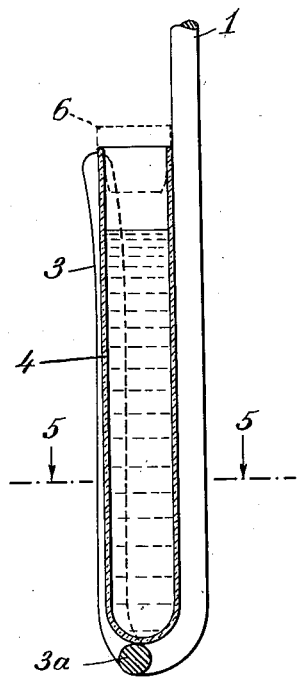
Fig. 4 is a bottom plan view of the device.
Figure 4:
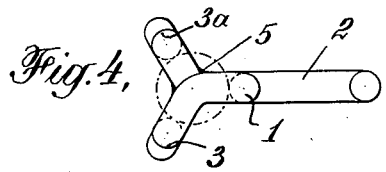
Figure 5:
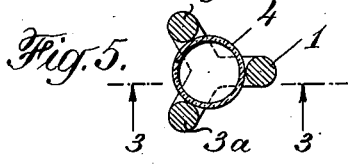
Fig. 5 is a sectional view taken along the line 5—5 of Fig. 3 and viewed in the direction of the arrows.

The illustrated embodiment of my handle and holder device comprises an elongated rod or handle member 1, preferably formed of circular section bar or rod stock or wire, which may be formed into a reverse or U-bend at the upper end to serve as a handle or hook for hanging the device from a support, as illustrated at 2. Stainless steel or other non-corrosive and somewhat resilient material is preferably employed to form the device. At or adjacent the lower end of the device 1 provide a number of clamping fingers 3 and 3a, which act in conjunction with the lower end of the handle or main rod 1 of the device to releasably secure thereto a test tube or other individual sampling container illustrated at 4. The fingers 3 and 3a may be conveniently formed as reversely bent extensions of the handle 1, which extend up substantially parallel to the handle but spaced therefrom and from each other by a distance sufficient to accommodate the test tube 4. As illustrated in Figs. 4 and 5, the two fingers 3 and 3a are spaced substantially equally from each other and from the handle 1, so that the fingers and the handle engage the cylindrical surface of the test tube at substantially equally spaced points and firmly secure it in place. The fingers 3 and 3a are slightly resilient, and are initially so formed that the space between them and the handle 1 is slightly smaller than the cross-sectional area of the test tube 4. When the test tube is placed between the fingers and the handle, the fingers spring outward slightly and so resiliently frictionally grip the test tube and prevent accidental removal thereof from the device while permitting ready removal by the operator.

Figure 1:
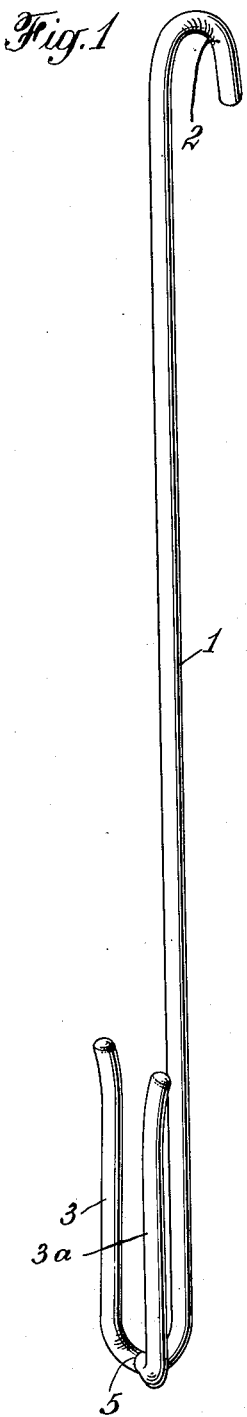
Fig. 1 is a perspective view of a device embodying the invention.
Figure 2:
Fig. 2 is a rear elevation of the device.
Figure 3:
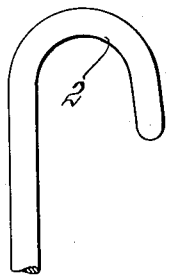
Fig. 3 is a side elevation, partly in section, taken along the line 3—3 of Fig. 5 and showing a test tube held by the device.

One of the fingers 3 may comprise an extension of the handle rod 1 reversely bent back upon itself as illustrated, and the other finger 3a may be welded or otherwise secured to the bend connecting the finger 3 to the handle 1 at 5, as is shown in Figs. 1 and 4. The upper ends of the fingers 3, 3a are preferably slightly flared outward in order to facilitate the insertion of the test tube between the fingers and the handle.

The connection between the finger 3a and the finger 3 and the handle at 5 serves as a stop to prevent the test tube from slipping down out of the lower end of the holder.

The described device is simple and easily manufactured. It can be readily transported by test personnel and forms a convenient means for use in sampling different cans or containers of milk or other liquid at locations where test facilities are not available. Thus, the filled samples may be enclosed within the test tubes by stoppers 6 immediately after the sample is taken, whereupon the tubes may be marked to identify them with the can or container from which the sample was taken and can be transported to the location where testing equipment is available.

The improved device is readily cleaned between testing operations by merely rinsing it in water and the device may also be used as a stirring rod to agitate the milk or other liquid prior to sampling in order to obtain a representative sample.

I claim:

A liquid sampling device comprising an elongated rod, two substantially parallel elongated resilient fingers extending substantially parallel to said rod adjacent one end thereof and spaced substantially equally from said rod and from each other, a cylindrical container inserted and frictionally secured between said fingers and said rod, said fingers approximating the length of a container to be held thereby and being substantially shorter than one-third the length of said rod, one of said fingers comprising a reversely bent extension of said rod and means for securing the other of said fingers directly to said rod and the first finger at such bend, the connections between said fingers and said rod forming a stop for limiting movement parallel to said rod of the container.

WILLIAM M. THOMSON.

REFERENCES CITED

The following references are of record in the file of this patent:

UNITED STATES PATENTS

| Number | Name | Date |
| --- | --- | --- |
| 834,188 | Carr | Oct. 23, 1906 |
| 1,744,054 | Mosgrove | Jan. 21, 1930 |
| 1,782,962 | Hobbs | Nov. 25, 1930 |
| 2,215,411 | Sebring | Sept. 17, 1940 |
| 2,236,063 | Losee | Mar. 25, 1941 |

FOREIGN PATENTS

| Number | Country | Date |
| --- | --- | --- |
| 269,756 | Great Britain | Apr. 28, 1927 |